(12) United States Patent
Boyd et al.

(10) Patent No.: US 8,064,442 B2
(45) Date of Patent: *Nov. 22, 2011

(54) METHOD AND APPARATUS FOR L3-AWARE SWITCHING IN AN ETHERNET PASSIVE OPTICAL NETWORK

(75) Inventors: Edward W. Boyd, Petaluma, CA (US); Russell Smith, Forestville, CA (US)

(73) Assignee: Broadcom Corporation, Irvine, CA (US)

( * ) Notice: Subject to any disclaimer, the term of this patent is extended or adjusted under 35 U.S.C. 154(b) by 117 days.

This patent is subject to a terminal disclaimer.

(21) Appl. No.: 12/259,281

(22) Filed: Oct. 27, 2008

(65) Prior Publication Data
US 2009/0047018 A1 Feb. 19, 2009

Related U.S. Application Data

(63) Continuation of application No. 11/115,753, filed on Apr. 26, 2005, now Pat. No. 7,443,850.

(60) Provisional application No. 60/566,537, filed on Apr. 28, 2004.

(51) Int. Cl.
*H04L 12/28* (2006.01)

(52) U.S. Cl. ........................................ 370/389; 370/390

(58) Field of Classification Search ............. 370/395.52, 370/389, 390, 392, 409, 395.53, 395.54
See application file for complete search history.

(56) References Cited

U.S. PATENT DOCUMENTS

| | | | |
|---|---|---|---|
| 6,967,949 B2 | 11/2005 | Davis | |
| 7,286,538 B2 * | 10/2007 | Song et al. | 370/392 |
| 7,362,704 B2 * | 4/2008 | Sisto et al. | 370/230 |
| 7,388,888 B2 * | 6/2008 | Lee et al. | 370/535 |
| 7,436,765 B2 * | 10/2008 | Sisto et al. | 370/230 |
| 7,505,459 B2 * | 3/2009 | Boyd | 370/389 |
| 7,630,639 B2 * | 12/2009 | Kramer et al. | 398/72 |
| 2003/0190168 A1 | 10/2003 | Song | |
| 2003/0235205 A1 | 12/2003 | Song | |

(Continued)

FOREIGN PATENT DOCUMENTS
JP  2003-169067 A  6/2003
(Continued)

OTHER PUBLICATIONS

Publication: "IETF RFC 3046 DHCP Relay Agent Information Option", by M. Patrick, Network Working Group, Jan. 2001, pp. 1-14.

(Continued)

*Primary Examiner* — Hassan Phillips
*Assistant Examiner* — Mark A Mais
(74) *Attorney, Agent, or Firm* — Sterne, Kessler, Goldstein & Fox P.L.L.C.

(57) ABSTRACT

One embodiment of the present invention provides a system that performs layer 3 (L3) aware switching in an Ethernet passive optical network (EPON) which includes a central node and at least one remote node. During operation, the system maintains a set of mapping information which indicates a correspondence relationship between a logical link identifier of a remote node, a medium access control (MAC) address for a subscriber coupled to the remote node, and an IP address for the subscriber. Upon receiving a packet which contains an IP address, the system selectively attaches a proper logical link identifier to the packet based on the mapping information and the IP address contained in the packet, thereby allowing only one proper remote node to receive the packet.

20 Claims, 7 Drawing Sheets

U.S. PATENT DOCUMENTS

| | | | |
|---|---|---|---|
| 2004/0057431 A1* | 3/2004 | Song et al. | 370/390 |
| 2004/0114592 A1 | 6/2004 | Kang | |
| 2004/0264400 A1 | 12/2004 | Lee | |
| 2005/0243837 A1 | 11/2005 | Boyd et al. | |

FOREIGN PATENT DOCUMENTS

| | | |
|---|---|---|
| JP | 2008-507159 A | 3/2008 |

OTHER PUBLICATIONS

Onishi, K., et al., "A Study of the Gigabit PON System for Ethernet Access Networks," *IEICE Technical Report* 103(415): 2-9, Institute of Electronics, Information and Communication Engineer's (IEICE), Japan (Nov. 2003).

Pesavento, G., "Ethernet Passive Optical Network (EPON) architecture for broadband access," David Su & David W. Griffith, (eds), *Optical Networks Magazine,* pp. 1-7, Kluwer Academic Publishers and SPIE (The International Society for Optical Engineering), (Jan./Feb. 2003).

English language Abstract for JP 2003-169067 A, Japanese Patent Office, Patent & Utility Model Gazette DB, Patent Abstracts of Japan, (2003).

* cited by examiner

| USER IP ADDRESSES 402 | USER MAC ADDRESSES 403 | ONU LLIDs 404 |
|---|---|---|
| IP ADDRESS 1 | USER MAC 1 | LLID 1 |
| IP ADDRESS 2 | USER MAC 2 | LLID 2 |
| IP ADDRESS 3 | USER MAC 3 | LLID 3 |
| ... | ... | ... |
| IP ADDRESS n-1 | USER MAC n-1 | LLID n |
| IP ADDRESS n | USER MAC n | LLID n-1 |

MAPPING TABLE 400

FIG. 4

METHOD AND APPARATUS FOR L3-AWARE SWITCHING IN AN ETHERNET PASSIVE OPTICAL NETWORK

RELATED APPLICATION

This application is a continuation of U.S. patent application Ser. No. 11/115,753, filed 26 April 2005, now U.S. Pat. No. 7,443,850, which claims the benefit of U.S. Provisional Patent Application Ser. No. 60/566,537, filed on 28 April 2004.

BACKGROUND

1. Field of the Invention

The present invention relates to packet switching in communication networks. More specifically, the present invention relates to a method and an apparatus for switching packets in an Ethernet passive optical network.

2. Related Art

In order to keep pace with increasing Internet traffic, optical fibers and optical transmission equipment have been widely deployed to substantially increase the capacity of backbone networks. However, this capacity increase in backbone networks has not been accompanied by a corresponding capacity increase in access networks. Therefore, even with broadband access solutions such as digital subscriber line (DSL) and cable modem (CM), the limited bandwidth offered by current access networks remains to be a severe bottleneck in delivering high bandwidth to end users.

Among the different technologies presently being developed, Ethernet passive optical networks (EPONs) are among the best candidates for next-generation access networks. EPONs combine ubiquitous Ethernet technology with inexpensive passive optics. They offer the simplicity and scalability of Ethernet with the cost-efficiency and high capacity of passive optics. Because of optical fiber's high bandwidth, EPONs can carry broadband voice, data, and video traffic simultaneously. Such integrated services are difficult to provide with DSL or CM technology. Furthermore, EPONs are more suitable for Internet Protocol (IP) traffic, because Ethernet frames can encapsulate native IP packets with different sizes. In contrast, ATM passive optical networks (APONs) use fixed-size ATM cells and require packet fragmentation and reassembly.

Typically, EPONs reside in the "first mile" of the network, which provides connectivity between the service provider's central offices and business or residential subscribers. This first mile network is often a logical point-to-multipoint network, with a central office servicing a number of subscribers. In a typical tree-topology EPON, one fiber couples the central office to a passive optical coupler, which divides and distributes downstream optical signals to users (subscribers). The coupler also combines upstream signals from subscribers (see FIG. 1).

Transmissions in an EPON are typically between an optical line terminal (OLT) and optical networks units (ONUs) (see FIG. 2). The OLT generally resides in the central office and couples the optical access network to an external network (e.g., a carrier network). An ONU can be located either at the curb or at an end-user location, and can provide broadband voice, data, and video services. ONUs are typically coupled to a one-by-N (1×N) passive optical coupler, which is coupled to the OLT through a single optical link. (Note that a number of optical couplers can be cascaded.) This configuration can achieve significant savings in the number of fibers and amount of hardware.

Communications within an EPON are divided into downstream traffic (from OLT to ONUs) and upstream traffic (from ONUs to OLT). In the upstream direction, the ONUs share channel capacity and resources, since there is only one link coupling the passive optical coupler to the OLT. In the downstream direction, because of the broadcast nature of the 1×N passive optical coupler, packets are broadcast by the OLT to all ONUs and are subsequently extracted by their destination ONUs. Each network device is assigned a Logical Link ID (LLID), according to the IEEE 802.3ah standard. A downstream packet is first processed at the OLT, where the packet receives the LLID of its destination, and is then transmitted to the ONUs. Although a packet is broadcast to all the ONUs, only the ONUs with an LLID that matches the one with the packet is allowed to receive the packet. Therefore, the OLT switches packets by attaching proper LLIDs to the packets. Note that in certain cases where broadcast or multicast is desired, the OLT attaches a corresponding broadcast/multicast LLID to a downstream packet so that a number of ONUs are allowed to receive the packet.

One challenge in designing a secure and cost effective EPON is to reduce undesired broadcast packets. Undesired broadcast packets exist in an EPON because certain packets used for performing IP-layer functions (also called layer-three or L3 functions) are defined to be broadcast packets in the IP layer (such as address resolution protocol (ARP) packets or dynamic host configuration protocol (DHCP) packets). In a conventional EPON, an OLT generally is regarded as a layer-two (L2) device and is expected to be transparent to L3 functionalities. Hence, an L3 broadcast packet is typically broadcast to all the ONUs within an EPON by the OLT. This creates a security concern because different ONUs may accommodate different subscribers, and a malicious subscriber can breach the security in the IP layer by, for example, spoofing an IP address which belongs to another subscriber.

Hence, what is needed is a method and apparatus for reducing these security risks in an EPON.

SUMMARY

One embodiment of the present invention provides a system that performs layer 3 (L3) aware switching in an Ethernet passive optical network (EPON) which includes a central node and at least one remote node. During operation, the system maintains a set of mapping information which indicates a correspondence relationship between a logical link identifier of a remote node, a medium access control (MAC) address for a subscriber coupled to the remote node, and an IP address for the subscriber. Upon receiving a packet which contains an IP address, the system selectively attaches a proper logical link identifier to the packet based on the mapping information and the IP address contained in the packet, thereby allowing only one proper remote node to receive the packet.

In a variation of this embodiment, selectively attaching the proper logical link identifier to the packet involves attaching to the packet a logical link identifier of a remote node if the mapping information indicates that the IP address contained in the packet corresponds to the logical link identifier of the remote node. In addition, the system discards the packet if the mapping information indicates no correspondence relationship between the IP address contained in the packet and the logical link identifier of any remote node.

In a variation of this embodiment, the packet is an address resolution protocol (ARP) request packet. In this variation, selectively attaching the proper logical link identifier to the packet involves attaching to the ARP request packet the logical link identifier of a remote node if the mapping information indicates that the target IP address contained in the ARP request packet corresponds to the logical link identifier of the remote node.

In a variation of this embodiment, the packet is an ARP request packet, and the system responds to the ARP request with a user MAC address corresponding to the target IP address contained in the ARP request packet, thereby avoiding forwarding the ARP request packet to any remote nodes.

In a variation of this embodiment, the system allows configuration of an IP address to be statically mapped to a logical link identifier of a remote node, a subscriber's MAC address, or both.

In a variation of this embodiment, the system establishes a correspondence relationship between a logical link identifier of a remote node, an IP address of a subscriber coupled to the remote node, and a MAC address for the subscriber by observing one or more dynamic host configuration protocol (DHCP) messages between the subscriber and a DHCP server.

In a further variation, the system forwards a DHCP response message only to the remote node to which the DHCP requesting subscriber is coupled, thereby avoiding broadcasting the DHCP message to multiple remote nodes in the EPON and reducing security risks associated with IP spoofing. In a further variation, the system limits the number of IP addresses associated with a user or a remote node by discarding DHCP requests from that user or remote node after the number of IP addresses associated with that user or remote node has reached an upper limit.

In a variation of this embodiment, the system adds to a DHCP request message the central node's and a remote node's logical link identifiers, thereby allowing a DHCP server to determine the EPON from which the DHCP request message is sent.

Another embodiment of the present invention provides a system that performs L3-aware switching in an EPON which includes a central node and at least one remote node. During operation, the system maintains at a remote node a list of IP addresses associated with one or more subscribers coupled to that remote node. The system forwards a packet from a user if the source IP address of the packet matches the IP address corresponding to the subscriber. In addition, the system discards a packet from a subscriber if the source IP address of the packet does not match the IP address corresponding to the subscriber.

BRIEF DESCRIPTION OF THE FIGURES

FIG. 4 illustrates a mapping table indicating a correspondence relationship between IP addresses, LLIDs, and subscriber MAC addresses in accordance to one embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, application specific integrated circuits (ASICs), field-programmable gate arrays (FPGAs), semiconductor memories, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated).

Passive Optical Network Topology

Figure 1:
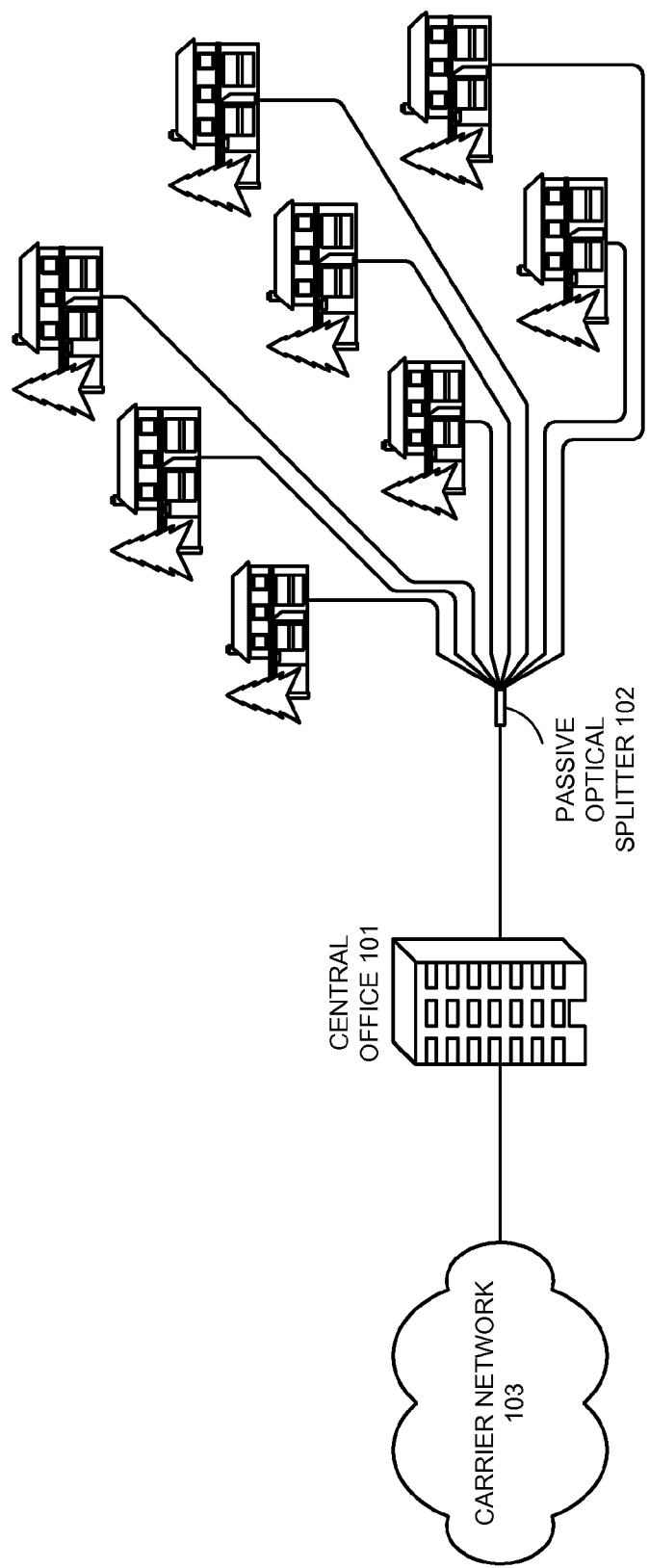
FIG. 1 illustrates a passive optical network wherein a central office and a number of subscribers are coupled through optical fibers and a passive optical splitter.

FIG. 1 illustrates a passive optical network, wherein a central office and a number of subscribers form a tree topology through optical fibers and a passive optical splitter (prior art). As shown in FIG. 1, a number of subscribers are coupled to a central office 101 through optical fibers and a passive optical splitter 102. Passive optical splitter 102 can be placed near end-user locations, so that the initial fiber deployment cost is minimized. The central office is coupled to an external network, such as a metropolitan area network operated by an ISP.

Normal Operation Mode in EPON

Figure 2:
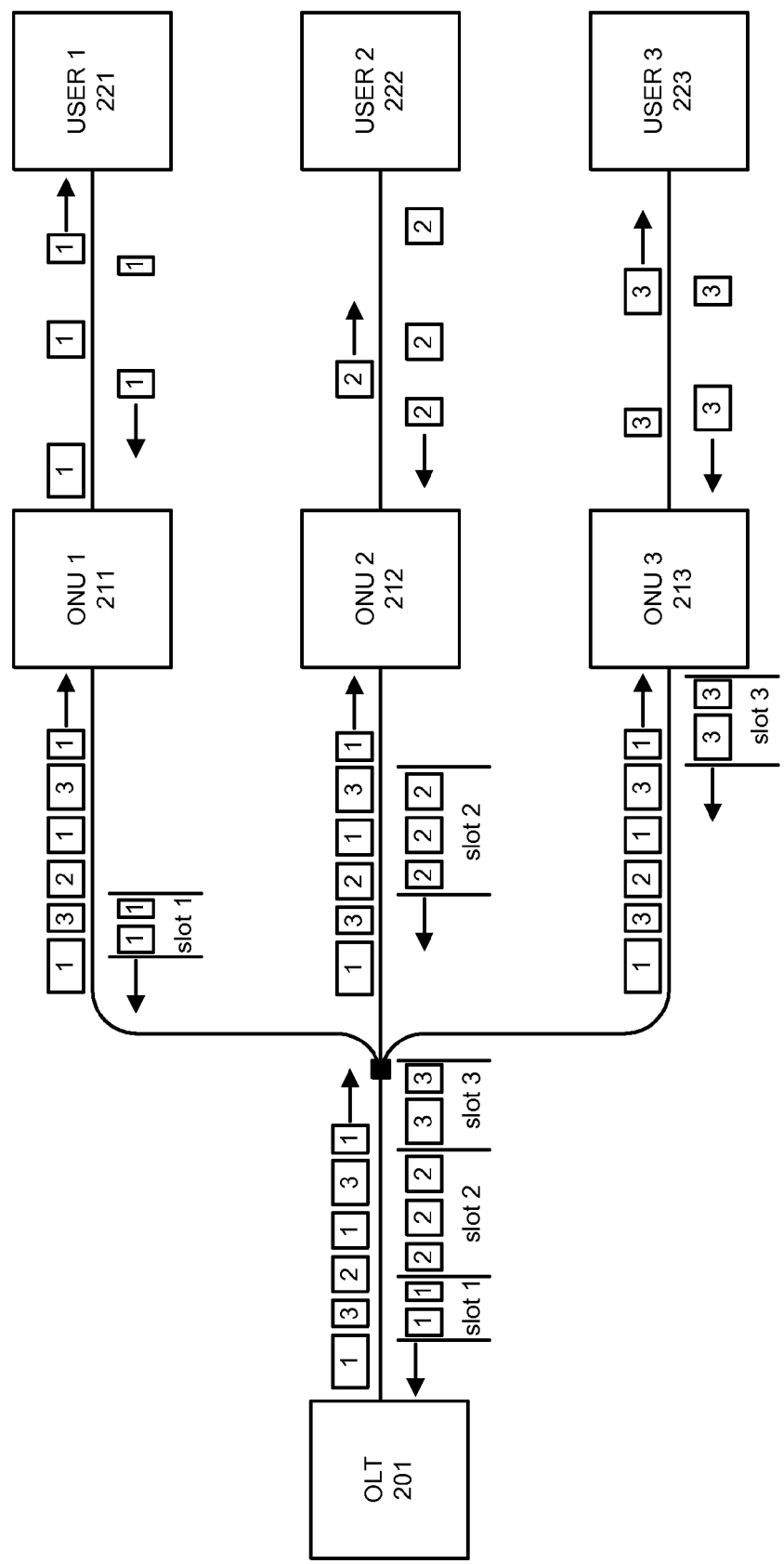
FIG. 2 illustrates an EPON in normal operation mode.

FIG. 2 illustrates an EPON in normal operation mode. An ONU typically can accommodate one or more networked devices, such as personal computers, telephones, video equipment, network servers, etc. Note that an ONU can identify itself by using a Logical Link Identifier (LLID), as defined in the IEEE 802.3 standard. To allow ONUs to join an EPON at arbitrary times, an EPON has two modes of operation: a normal operation mode and a discovery (initialization) mode. Normal operation mode allows regular upstream data transmissions, where transmission opportunities are assigned to all initialized ONUs.

As shown in FIG. 2, in the downstream direction, an OLT 201 broadcasts downstream data to ONU 1 (211), ONU 2 (212), and ONU 3 (213). While all ONUs receive the same copy of downstream data, each ONU selectively forwards only the data destined to itself to its corresponding users, which are user 1 (221), user 2 (222), and user 3 (223), respectively.

In the upstream direction, OLT 201 first schedules and assigns transmission windows to each ONU according to the ONU's service-level agreement. When not in its transmission timeslot, an ONU typically buffers the data received from its user. When its scheduled transmission timeslot arrives, an ONU transmits the buffered user data within the assigned transmission window.

Since every ONU takes turns in transmitting upstream data according to the OLT's scheduling, the upstream link's capacity can be efficiently utilized. However, for the scheduling to work properly, the OLT needs to discover and initialize a newly joined ONU. During discovery, the OLT may collect information critical to transmission scheduling, such as the ONU's round-trip propagation delay, its media access (MAC) address, its service-level agreement, etc.

L3 Aware Switching in EPON

In a conventional EPON, an OLT switches downstream packets by attaching unicast or broadcast LLIDs to each packet. If the OLT has knowledge of the LLID of the ONU to which a subscriber is coupled, the OLT can switch a downstream packet destined to that subscriber by attaching a proper unicast LLID to the packet based on the subscriber's MAC address. If the destination MAC address of a downstream packet is unknown to the OLT, the OLT typically forwards the packet to all the ONUs by attaching a broadcast LLID to the packet.

Broadcast packets are common in L3 applications, such as ARP and DHCP. In general, a conventional OLT blindly broadcasts such IP packets to all the ONUs. This is because an OLT is typically regarded as an L2 device and is expected to be transparent to L3 applications. Although this configuration is simple to implement, it is not very secure against IP attacks. For example, an ARP request from an external network can be broadcast to all ONUs, although it is intended to a single subscriber coupled to a single ONU. When the ARP request is broadcast to all the ONUs, a rogue subscriber may see the target IP address contained in the ARP request which belongs to another subscriber. This rogue subscriber can subsequently spoof this IP address by responding to this ARP request message.

A similar security risk exists in DHCP applications. Conventionally, a DHCP server responds to a subscriber's DHCP request with a broadcast packet which contains the IP address assigned to the requesting subscriber. If an OLT blindly broadcasts this DHCP response, a rogue subscriber residing in the same EPON can intercept the assigned IP address.

Because of the aforementioned security risks, it is desirable to avoid unnecessary broadcasting of certain IP packets. One possible solution is similar to the Point-to-Point over Ethernet (PPPoE) approach used in DSL networks as described in IETF RFC 2516. This solution typically requires a remote access server which authenticates each subscriber. Although PPPoE performs well in low-speed DSL networks, it is not suitable for high-speed access networks such as EPON. This is because the capacity of an EPON is much higher than that of DSL networks, and an EPON may accommodate a significantly larger number of subscribers. Therefore, a remote access server may not be able to handle all the requests from the subscribers in a cost effective and scalable way.

Another approach is to provision a separate virtual local area network (VLAN) to every subscriber. This solution is suitable for a small number of high-end commercial subscribers. However, it is not a cost effective and scalable solution for a large number of residential subscribers. The provisioning of a large number of VLANs inevitably burdens core-network equipment, such as edge routers, gateways, and video servers. This is because for a piece of core-network equipment to handle VLAN traffic, it is often required to maintain the state information of all the VLANs. Therefore, a large number of VLANs can impair its performance.

A more desirable approach to mitigate L3 security risks is to perform L3-aware switching within an EPON. One embodiment of the present invention adopts schemes to monitor downstream and upstream IP traffic within an EPON and use the information contained in the IP packets to assist its switching decisions. With this approach, no additional server (such as a remote access server used in PPPoE) is required for normal operation, and there is no extra burden on core network equipment.

Figure 3:
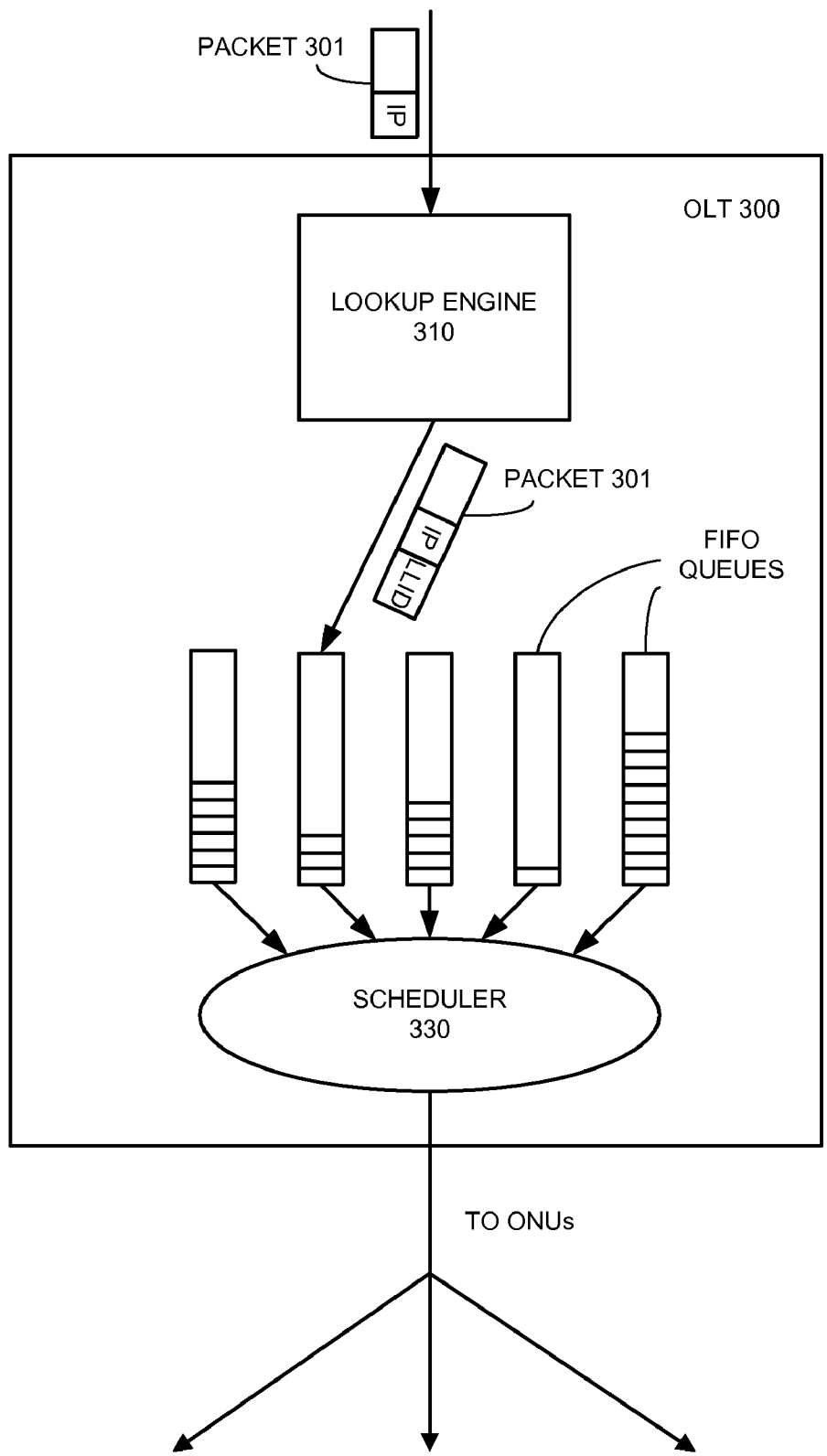
FIG. 3 illustrates L3-aware switching by an OLT in accordance to one embodiment of the present invention.

FIG. 3 illustrates L3-aware switching by an OLT in accordance to one embodiment of the present invention. When a downstream IP packet 301 arrives at OLT 300, OLT 300 reads the IP address-information contained in packet 301 and assigns a proper LLID to packet 301. A lookup engine 310 performs the critical lookup process to determine what LLID to attach to packet 301.

Accordingly, lookup engine 310 makes the switching decision based on a mapping table which indicates a correspondence relationship between an IP address, an ONU's LLID, and a user's MAC address. In this way, if packet 301 is a conventional broadcast IP packet (e.g., an ARP request packet or a DHCP acknowledge packet), OLT 300 can forward packet 301, using a unicast LLID, to only one ONU accommodating the correct destination subscribe.

When lookup engine 310 assigns packet 301 an LLID, lookup engine 310 may also determine in which first-in-first-serve (FIFO) queue packet 301 will be stored according to packet 301's quality-of-service (QoS) level. As shown in FIG. 3, a number of FIFO queues store downstream packets before they are transmitted. Scheduler 330 regularly pulls packets from each FIFO queue and transmits the packets downstream to the ONUs. By adjusting the frequency of its serving of each FIFO queue, scheduler 330 can implement different QoS levels according to service level agreements (SLAs). When packet 301 is broadcast to all the ONUs, only ONUs with an LLID that matches the LLID carried by packet 301 is allowed to receive packet 301. Thus, by labeling a packet with a proper LLID and storing the packet in a proper FIFO queue, lookup engine 310 performs a switching function while satisfying the packet's QoS requirement.

FIG. 4 illustrates a mapping table indicating a correspondence relationship between IP addresses, LLIDs, and subscriber MAC addresses in accordance to one embodiment of the present invention. In this example, a mapping table 400 includes three columns: column 402 which contains IP addresses assigned to subscribers, column 403 which contains subscribers' MAC addresses, and column 404 which contains the LLIDs of ONUs corresponding to the subscribers.

When for example an ARP request packet arrives at an OLT, the OLT reads the target IP address and searches table 400 for this IP address. If the IP address is found, the OLT subsequently attaches to the packet the LLID in the corresponding row. This LLID corresponds to the ONU to which the target subscriber is coupled. Therefore, the OLT can forward an ARP request packet to a single ONU with its unicast LLID.

Static Configuration and Dynamic Learning of Mapping Relationship

Figure 5:
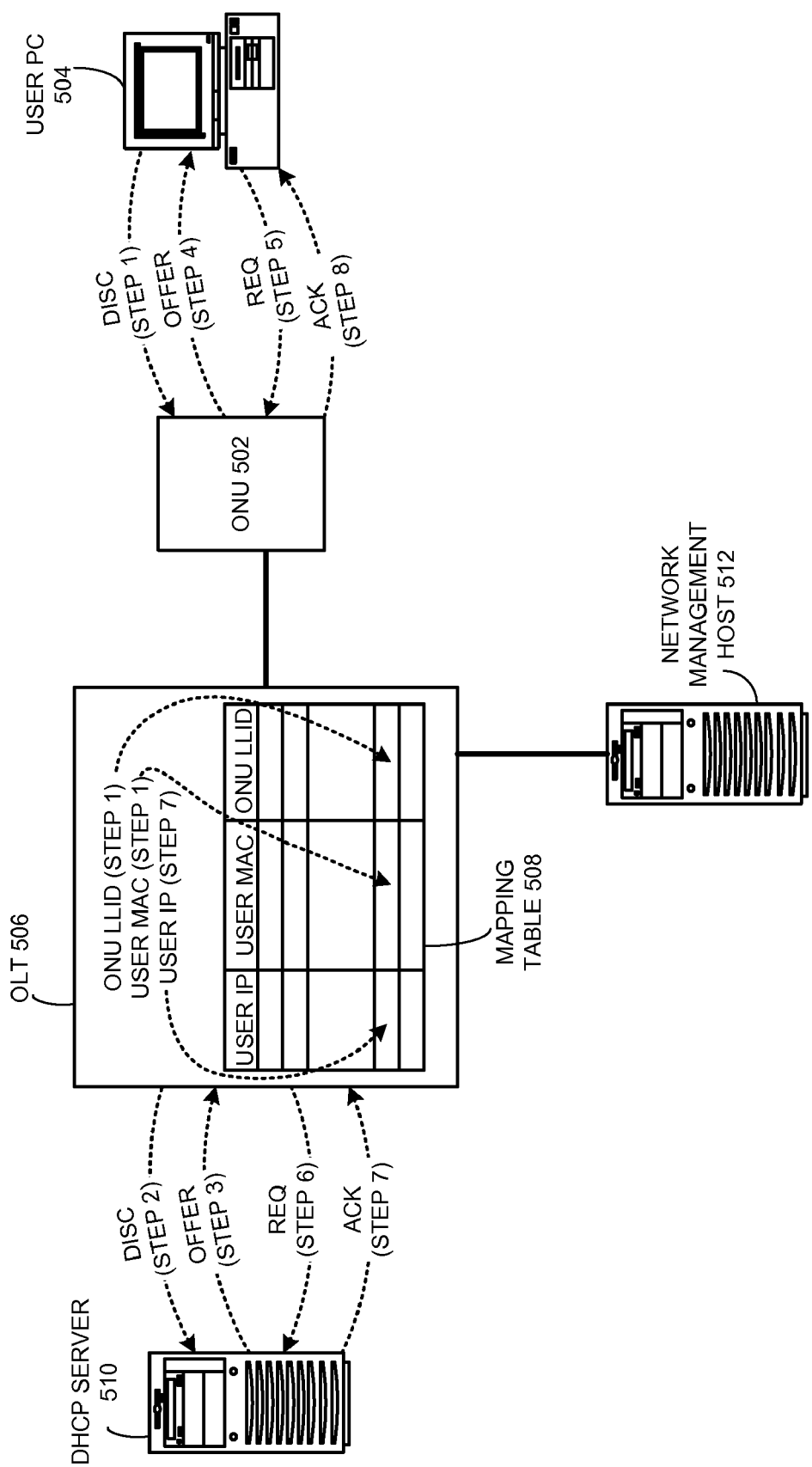
FIG. 5 illustrates the static configuration and dynamic learning of a mapping between a subscriber's IP address, its MAC address, and a corresponding ONU LLID in accordance with an embodiment of the present invention.

FIG. 5 illustrates the static configuration and dynamic learning of a mapping between a subscriber's IP address, its MAC address, and a corresponding ONU LLID in accordance with an embodiment of the present invention. To correctly perform L3-aware switching, an OLT ideally maintains a mapping table that accurately indicates the correspondence relationship between a subscriber's MAC address, its corresponding ONU's LLID, and the IP address assigned to it. An OLT can establish this a mapping table through either static configuration or dynamic learning.

As shown in FIG. 5, when static configuration is used, a network management host 512 is coupled to an OLT 506.

Host 512 assigns IP addresses to subscribers and establishes a mapping relationship between a subscriber's IP address, its MAC address, and its ONU's LLID in a mapping table 508. The IP addresses assigned by network management host 512 are typically static. Downstream packets with IP destination addresses which match a static IP address in mapping table 508 are assigned the proper LLID and subsequently received and forwarded to the proper subscriber by only one ONU. Conversely, packets with IP destination addresses not matching any IP addresses in mapping table 508 may be discarded.

Once mapping table 508 is established, the information contained therein can also assist filtering of upstream packets. In one embodiment of the present invention, upstream packets with IP source addresses not matching any IP addresses in mapping table 508 are discarded. In addition, the system may limit the number of IP addresses each subscriber or ONU can have by either limiting the number of IP-address entries corresponding to a subscriber or an ONU in mapping table 508, or by limiting the number of upstream DHCP requests. Note that upstream packet filtering may occur at an OLT or at an ONU. If upstream filtering occurs at an ONU, the ONU ideally maintains a similar mapping table which indicates a correspondence relationship between IP addresses and subscribers' MAC addresses.

In addition to static configuration of subscriber IP addresses, OLT 506 can also dynamically learn a subscriber's IP address by snooping the DHCP packets communicated from and to the subscriber. As shown in FIG. 5, when a subscriber (a user PC 504 in this example) joins the EPON, it first sends out a DHCP discovery (DISC) message (step 1), following which ONU 502 forwards this message to OLT 506. Upon receiving the DHCP discovery message, OLT 506 learns the subscriber's MAC address, correlates it with ONU 502's LLID, and adds an entry to mapping table 508. OLT 506 then forwards the DHCP discovery message further upstream to a DHCP server 510 (step 2).

Upon receiving the DHCP discovery message, DHCP server 510 responds with a DHCP offer message (step 3). OLT 506 subsequently attaches ONU 502's LLID to the DHCP offer message and passes it on to ONU 502. ONU 502 then forwards the message to user PC 504 (step 4). After receiving the DHCP offer message, user PC 504 sends a DHCP request (REQ) message (step 5). Next, OLT 506 forwards the DHCP request message to DHCP server 510 (step 6).

Upon receiving the DHCP request message, DHCP server 510 sends a DHCP acknowledgment (ACK) message in which it assigns an IP address to user PC 504 (step 7). OLT 506 subsequently reads the DHCP acknowledgment message and learns user PC 504's assigned IP addresses. Accordingly, OLT 506 enters this IP address to the corresponding entry in mapping table 508. OLT 506 subsequently attaches ONU 502's LLID to the DHCP acknowledgment message and passes it on to ONU 502 which forwards the message to user PC 504 (step 8).

In one embodiment of the present invention, OLT 506 can modify the upstream DHCP packets to include a requesting ONU's and the OLT's logical link identifier. In this way, the DHCP server can determine a mapping relationship between the issued IP addresses and their corresponding OLTs and ONUs.

ARP Proxy and Directed ARP Operation

One advantage of L3-aware switching in EPON is that it allows an OLT to perform more secure ARP operations. In one embodiment of the present invention, an OLT can act as an ARP proxy and reply to an ARP request targeted at a subscriber based on the mapping information it maintains for that subscriber. By doing so, the OLT can avoid broadcasting the ARP request to all the ONUs and reduce the risks of IP spoofing.

Figure 6:
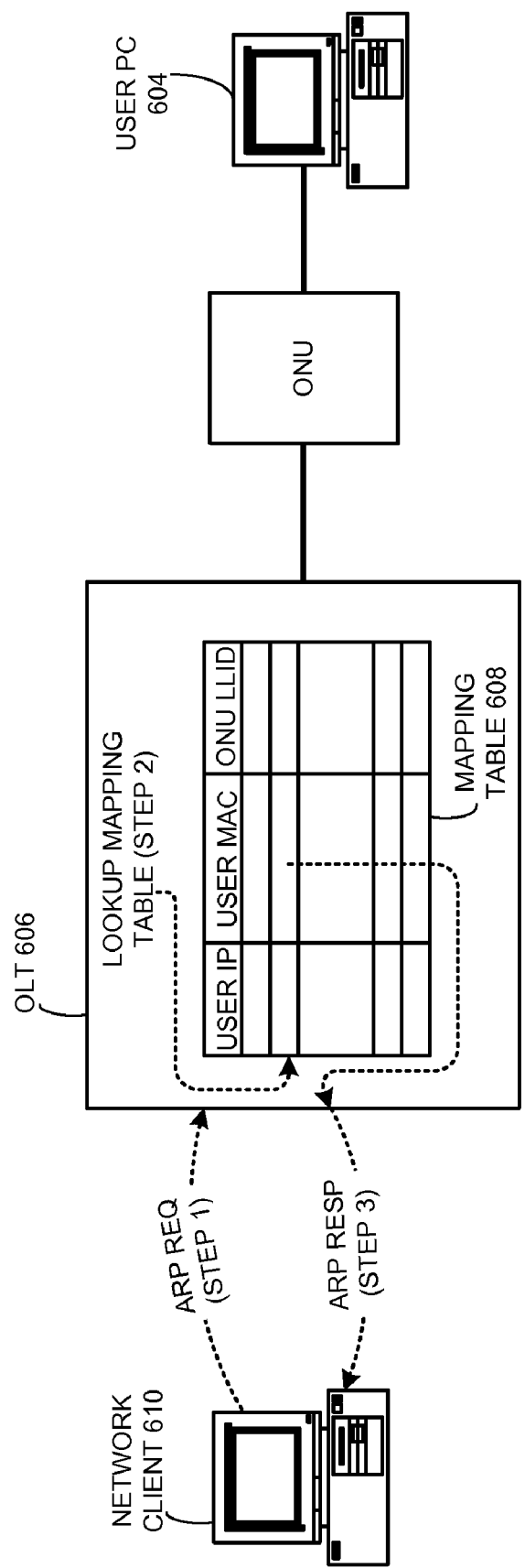
FIG. 6 illustrates the process of an OLT responding to an ARP request in accordance with an embodiment of the present invention.

FIG. 6 illustrates the process of an OLT responding to an ARP request in accordance with an embodiment of the present invention. As shown in FIG. 6, a network client 610 sends an ARP request message to an OLT 606 (step 1), wherein the ARP request message contains a target IP address of a user PC 604. Upon receiving the ARP request, OLT 606 searches a mapping table 608 and finds an IP address entry that matches the target IP address in the ARP request (step 2). OLT 606 subsequently sends an ARP response to network client 610 with the target subscriber's MAC address (step 3). Note that during the exchange process, user PC 604 and its ONU are shielded from the ARP communications. In effect, OLT 606 functions as an ARP proxy for user PC 604.

Figure 7:
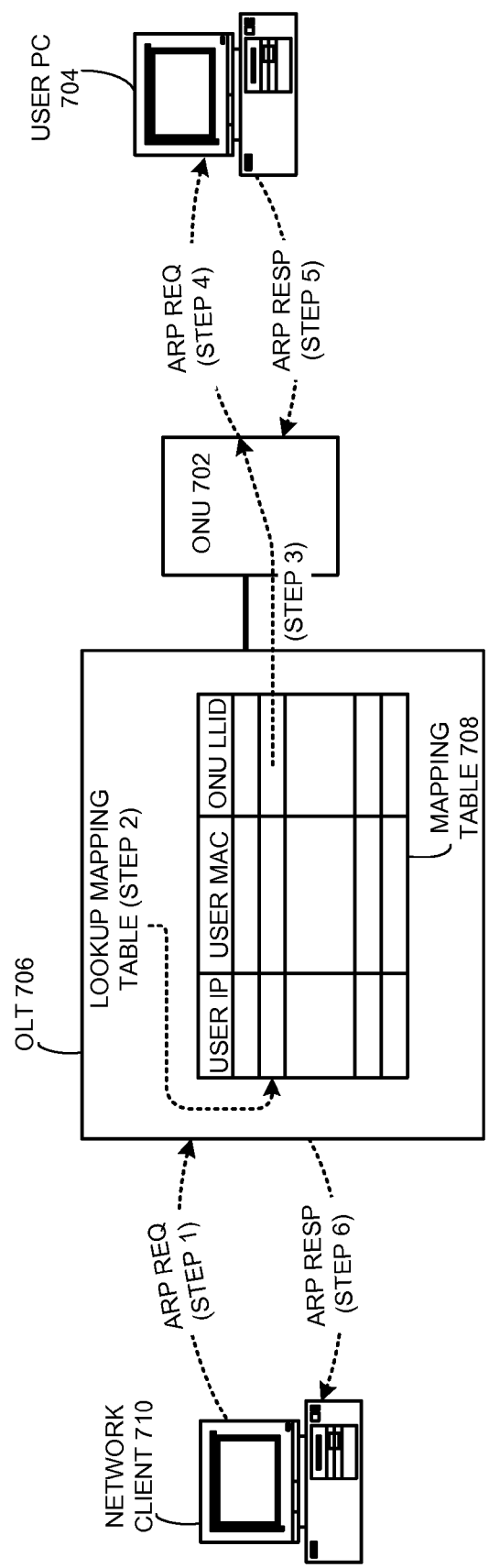
FIG. 7 illustrates the process of an OLT forwarding an ARP request to the target ONU in accordance with an embodiment of the present invention.

Sometimes a network operator may prefer that a subscriber, instead of the OLT, respond to an ARP request. In this case, an OLT can perform a directed ARP operation. FIG. 7 illustrates the process of an OLT forwarding an ARP request to the target ONU in accordance with an embodiment of the present invention. In this example, a network client 710 first sends an ARP request to an OLT 706 (step 1). Upon receiving the ARP request, OLT 706 searches a mapping table 708 and finds an IP address entry that matches the target IP address in the ARP request (step 2). OLT 706 subsequently retrieves an ONU LLID which corresponds to the IP address, attaches the LLID to the ARP request message, and sends it to a target ONU 702 (step 3).

Next, ONU 702 forwards the ARP request to a user PC 704 which possesses the target IP address (step 4). User PC 704 subsequently replies with an ARP response which contains its MAC address (step 5). ONU 702 then forwards the ARP response upstream to OLT 706, which relays the ARP response to network client 710 (step 6).

Note that the system can implement several security measures in a directed ARP operation. For example, OLT 706 may discard the ARP request message if it does not find a matching IP address in mapping table 708. In addition, if the subscriber MAC address in an upstream ARP response does not match the MAC address contained in mapping table 708, OLT 706 may also discard the ARP response to prevent IP spoofing.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for performing layer 3 (L3) aware switching in an Ethernet passive optical network (EPON), the method comprising:
    observing a message from a subscriber to determine a first Internet Protocol (IP) address assigned to the subscriber;
    maintaining a mapping between a logical link identifier (LLID) of an optical network unit (ONU) that corresponds to the subscriber and to at least one of a medium access control (MAC) address of the subscriber and the first IP address;
    receiving a packet which contains a second IP address;
    attaching the LLID to the packet based on the mapping and the second IP address contained in the packet; and
    forwarding the packet to the ONU corresponding to the LLID when the second IP address matches the first IP address.

2. The method of claim 1, wherein the LLID is mapped to multiple first IP addresses.

3. The method of claim 1, wherein the packet contains a request for address resolution, and wherein attaching the LLID to the packet comprises:
   attaching to the packet the LLID when the mapping indicates that a target address contained in the request for address resolution corresponds to the LLID.

4. The method of claim 1, wherein the packet contains an address resolution request, and wherein the method further comprises:
   responding to the address resolution request with a user layer-2 address corresponding to a target address contained in the packet.

5. The method of claim 1, further comprising:
   allowing configuration of the first IP address to be statically mapped to at least one of the LLID and the MAC address.

6. The method of claim 1, wherein the observing the message comprises:
   observing a dynamic host configuration protocol (DHCP) message between the subscriber and a DHCP server.

7. The method of claim 6, further comprising:
   forwarding a DHCP response message only to the ONU to which the DHCP requesting subscriber is coupled without broadcasting the DHCP message.

8. A method for performing layer 3 (L3) aware switching in an Ethernet passive optical network (EPON), comprising:
   observing a packet from a subscriber to determine an Internet Protocol (IP) address assigned to the subscriber;
   maintaining, at an optical network unit (ONU), a list of IP addresses associated with one or more subscribers;
   forwarding, by the ONU, the packet from the subscriber when the IP address of the packet matches an IP address on the list of IP addresses; and
   discarding, by the ONU, the packet from the subscriber when the IP address of the packet does not match any IP address on the list of IP addresses.

9. An Ethernet passive optical network (EPON) comprising:
   a reader configured to read a message from a subscriber and to determine a first internet protocol (IP) address associated with the subscriber;
   a memory configured to store a mapping table that maintains a mapping between a logical link identifier (LLID) of an optical network unit (ONU) that corresponds to the subscriber and to at least one of a medium access control (MAC) address associated with the subscriber and the first IP address;
   a receiver configured to receive a packet including a second IP address;
   a processor configured to attach the LLID to the packet based on the mapping and the second IP address; and
   a transmitter configured to transmit the packet to the ONU corresponding to the LLID when the second IP address matches the first IP address.

10. The Ethernet passive optical network of claim 9, wherein the LLID is mapped with multiple first IP addresses.

11. The Ethernet passive optical network of claim 9, wherein the packet contains a request for address resolution, and wherein the processor is configured to attach the LLID to the packet when the mapping indicates that a target address contained in the request for address resolution corresponds to the LLID.

12. The Ethernet passive optical network of claim 9, wherein the packet contains an address resolution request, and wherein the transmitter is configured to transmit, in response to the address resolution request, a user layer-2 address corresponding to a target address contained in the packet.

13. The Ethernet passive optical network of claim 9, wherein the mapping table allows the first IP address to be statically mapped to at least one of the LLID and the MAC address.

14. The Ethernet passive optical network of claim 9, wherein the message read by the reader is a dynamic host configuration protocol (DHCP) message between the subscriber and a DHCP server.

15. The Ethernet passive optical network of claim 14, wherein the transmitter is configured to transmit a DHCP response message only to the ONU to which the DHCP requesting subscriber is coupled, without broadcasting the DHCP message.

16. The Ethernet passive optical network of claim 9, wherein the memory, storing the mapping table, is configured to obtain the subscriber's MAC address, and to correlate the subscriber's MAC address with the LLID of the ONU.

17. The Ethernet passive optical network of claim 1, wherein the processor is configured to function as a proxy, and the transmitter is configured to reply to a request targeted at the subscriber based on the mapping maintained by the mapping table for the subscriber.

18. The Ethernet passive optical network of claim 17, wherein the processor is configured to discard the request targeted at a subscriber when a third IP address included in the request does not match the first IP address.

19. The method of claim 1, further comprising:
    storing, in a memory queue, multiple downstream packets to which corresponding LLIDs have been attached; and
    scheduling, via a scheduler, transmission of each of the stored multiple packets according to predetermined quality of service levels.

20. The Ethernet passive optical network of claim 9, further comprising:
    a memory queue configured to store downstream packets to which corresponding LLIDs have been attached to; and
    a scheduler configured to schedule transmission of each of the multiple packets stored in the queue according to predetermined quality of service levels.

* * * * *